(12) United States Patent
Foong et al.

(10) Patent No.: US 7,022,644 B2
(45) Date of Patent: Apr. 4, 2006

(54) HYDROGEN SULFIDE-SUPPRESSING CATALYST COMPOSITIONS

(75) Inventors: John S. Foong, Piscataway, NJ (US); Harold N. Rabinowitz, Upper Montclair, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/079,450

(22) Filed: Feb. 20, 2002

(65) Prior Publication Data

US 2003/0158037 A1 Aug. 21, 2003

(51) Int. Cl.
*B01J 23/02* (2006.01)

(52) U.S. Cl. ........................ 502/303; 502/325; 502/328; 502/302; 502/327; 502/339; 502/340; 502/349; 502/355

(58) Field of Classification Search ................ 502/325, 502/328, 302, 303, 339, 340, 349, 355, 327
See application file for complete search history.

(56) References Cited

U.S. PATENT DOCUMENTS

| | | | |
|---|---|---|---|
| 4,552,733 A | 11/1985 | Thompson et al. | 423/213.5 |
| 4,780,447 A | 10/1988 | Kim et al. | 502/243 |
| 4,923,842 A | 5/1990 | Summers | 502/261 |
| 4,939,113 A | 7/1990 | Tauster et al. | 502/251 |
| 4,977,129 A | 12/1990 | Ernest | 502/330 |
| 5,045,521 A | 9/1991 | Lox et al. | 502/304 |
| 5,057,483 A * | 10/1991 | Wan | 502/304 |
| 5,116,800 A * | 5/1992 | Williamson et al. | 502/303 |
| 5,196,390 A | 3/1993 | Tauster et al. | 502/251 |
| 5,254,519 A | 10/1993 | Wan et al. | 502/252 |
| 5,286,699 A | 2/1994 | Ohata et al. | 502/304 |
| 5,677,258 A | 10/1997 | Kurokawa et al. | 502/303 |
| 5,702,675 A * | 12/1997 | Takeshima et al. | 423/213.5 |
| 5,874,057 A | 2/1999 | Deeba et al. | 423/239.1 |
| 6,022,825 A | 2/2000 | Andersen et al. | 502/303 |
| 6,066,587 A * | 5/2000 | Kurokawa et al. | 502/66 |
| 6,254,842 B1 | 7/2001 | Hu et al. | 423/213.5 |
| 6,294,140 B1 | 9/2001 | Mussmann et al. | 423/213.5 |
| 6,348,430 B1 * | 2/2002 | Lindner et al. | 502/304 |
| 2002/0091064 A1 * | 7/2002 | Nakamura et al. | 502/302 |
| 2003/0021745 A1 * | 1/2003 | Chen | 423/239.1 |
| 2003/0083197 A1 * | 5/2003 | Noda et al. | 502/344 |
| 2003/0100447 A1 * | 5/2003 | Deeba et al. | 502/339 |

FOREIGN PATENT DOCUMENTS

| | | | |
|---|---|---|---|
| EP | 0 427 493 A2 | | 11/1990 |
| EP | 0 885 650 | * | 12/1998 |
| EP | 0 931 590 A1 | | 7/1999 |
| EP | 1 138 382 A1 | | 4/2001 |

* cited by examiner

*Primary Examiner*—Christina Johnson
(74) *Attorney, Agent, or Firm*—Richard A. Negin

(57) ABSTRACT

Hydrogen sulfide formation is suppressed by a three-way conversion catalyst having an underlayer and a topcoat overlying the under layer. The under layer is prepared by dispersing a Group IIa metal oxide such as an oxide of magnesium, calcium, barium or strontium on a carrier such as a refractory metal oxide monolith. A topcoat overlying the undercoat is comprised of a three-way conversion catalyst material such as a platinum-group metal catalytic component, e.g., platinum, palladium, rhodium or mixtures thereof.

17 Claims, No Drawings

HYDROGEN SULFIDE-SUPPRESSING CATALYST COMPOSITIONS

BACKGROUND OF THE INVENTION

1. Field of the Invention

The present invention is concerned with three-way conversion ("TWC") catalyst compositions which are effective for the suppression of hydrogen sulfide. The catalyst compositions may be used in the "close-coupled" or "medium-coupled" mode. Optionally, a downstream underfloor catalytic converter may also be present.

2. Description of Related Art

The use of TWC catalyst compositions to treat the exhaust gases emanating from internal combustion engines, e.g., automobile engines, is well known. Such catalyst compositions are polyfunctional in that they simultaneously treat unburned hydrocarbons, carbon monoxide and nitrogen oxides in the exhaust gases.

"Close-coupled" catalysts are known in the prior art and are generally defined as located in the engine compartment, typically less than one foot, more typically less than six inches from, and commonly attached directly to, the outlet of the exhaust manifold. "Medium-coupled" catalysts are also known in the prior art and are generally defined as located (downstream of any close-coupled catalyst) usually not more than about twenty-four, typically eighteen, inches from the outlet of the exhaust manifold. Underfloor catalytic converters are also known in the prior art and are located (downstream of any close-coupled and/or medium-coupled catalysts) under the floor of the vehicle adjacent to or in combination with the vehicle's muffler.

In many cases, TWC catalysts convert sulfur compounds contained in the exhaust gases into hydrogen sulfide which is quite toxic and is well known for its extremely disagreeable odor, even in minute quantities. Methods of suppressing the formation of hydrogen sulfide by including cobalt, nickel, iron, manganese or rhenium in the TWC catalyst compositions are known. For example, U.S. Pat. No. 4,552,733 discloses TWC catalyst compositions comprising one or more platinum-group metals dispersed on a gamma alumina support wherein a base metal oxide is dispersed with the platinum-group metal. The base metal oxide may be nickel, iron or manganese. The catalyst described in the '733 patent is stated to have three-way capability without producing appreciable quantities of hydrogen sulfide, sulfur trioxide or sulfuric acid. See also U.S. Pat. No. 4,780,447 which discloses a catalyst which is capable of controlling HC, CO and $NO_x$ as well as $H_2S$ in emissions from the tailpipe of catalytic converter-equipped automobiles. The use of the oxides of nickel and/or iron is disclosed as a hydrogen sulfide gettering-type of compound.

There is concern in Europe, however, that cobalt and nickel compounds may be carcinogens and therefore, automotive manufacturers are reluctant to use catalysts containing such metals. In other cases, the net effect of including iron, manganese or rhenium in the TWC catalyst is considered negative by automotive manufacturers even though significant positive effects are obtained by their inclusion.

U.S. Pat. No. 5,196,390 overcomes many of the problems alluded to above by providing TWC catalyst compositions which suppress $H_2S$ formation. The TWC catalysts provided by the '390 patent involve the incorporation of a nickel, manganese or iron oxide into an undercoat layer disposed on a substrate, such as cordierite. A topcoat overlying the undercoat is comprised of a platinum-group metal, i.e., platinum, palladium, rhodium or mixtures of two or more of the foregoing platinum-group metals.

Although the '390 patent represented a significant advance in TWC catalysts having hydrogen sulfide-suppression properties, automotive manufacturers are nevertheless still reluctant to use TWC catalyst compositions containing a nickel, manganese or iron oxide.

SUMMARY OF THE INVENTION

In accordance with the present invention, there is provided a TWC catalyst composition which has the capability of suppressing the release of hydrogen sulfide through the exhaust system of an internal combustion engine such as an automobile engine. The catalyst composition is installed, e.g., in the form of bricks, canisters, etc., in the duct system leading from the exhaust manifold of the engine to the atmosphere. The catalyst compositions are installed in the duct system in a close-coupled and/or medium-coupled mode, and optionally in an underfloor catalytic converter.

The TWC catalyst compositions for suppressing the release of hydrogen sulfide comprise a Group IIa metal oxide undercoat dispersed on a carrier and a topcoat overlying the undercoat comprising a three-way conversion catalyst material dispersed on a support.

DETAILED DESCRIPTION OF THE INVENTION

The present invention is directed to a catalyst composition which suppresses the formation of hydrogen sulfide in addition to converting the three classes of pollutants (unburned hydrocarbons, carbon monoxide and nitrogen oxides) found in the exhaust gas streams emanating from internal combustion engines. The catalyst composition of the present invention significantly reduces or avoids the detrimental interactions produced by prior art catalyst compositions by segregating the hydrogen sulfide-suppressing material in an undercoat disposed beneath a topcoat of catalyst material providing three-way conversion catalytic activity.

The hydrogen sulfide-suppressing material may be applied as an initial coating or layer, i.e., "undercoat" (also interchangeably referred to as an "underlayer") directly on a suitable carrier such as a monolith. The initial coating or layer is thereafter covered by one or more coatings or layers (i.e., "topcoat(s)") of the catalyst material providing three-way conversion catalytic activity. This multi-layering approach significantly reduces or avoids interactions between the three-way conversion catalyst material in the topcoat(s) and the hydrogen sulfide-suppressing material in the undercoat. This approach is especially beneficial in those cases wherein the hydrogen sulfide-suppressing material is susceptible to attrition losses and/or has the potential to interact with the three-way conversion catalyst material. By placing the hydrogen sulfide-suppressing material, i.e., the Group IIa metal oxide in an undercoat which is protected by a topcoat, potential losses of metal oxides by attrition are reduced or eliminated and potential environmental concerns associated with losing the metal oxides into the atmosphere by attrition are alleviated.

Alternatively, the hydrogen sulfide-suppressing component may be dispersed on a high surface area support such as gamma alumina. As used herein and in the claims, the term "gamma alumina" is used to refer to high surface area catalytically active forms of alumina which often included other high surface area alumina phases such as eta, theta and delta alumina. It is to be understood, therefore, that the term "gamma alumina" does not exclude the presence of other alumina phases. The resultant hydrogen sulfide-suppressing component dispersed on the high surface area support may, in turn, be dispersed upon the carrier.

The catalyst composition of the invention comprises a three-way conversion catalyst material and a hydrogen sulfide-suppressing component segregated from each other to the extent that they are disposed in respective discrete layers, which layers may be in contact with each other, and which is positioned in the exhaust system of an internal combustion engine. The three-way conversion catalyst layer, i.e., the topcoat, may itself be a single layer or two or more layers of catalyst material. Accordingly, reference herein and in the claims to a "topcoat" overlying the metal oxide(s)-containing undercoat should be understood to encompass both a single layer catalyst topcoat and a catalyst topcoat comprised of two or more layers. For the purposes of the present invention, it is preferred that the topcoat overlying the undercoat comprising the hydrogen sulfide-suppressing component comprise a middle layer overlying the undercoat and an upper layer overlying the middle layer.

The carrier upon which the Group IIa metal oxide(s) are dispersed (as is or dispersed upon a high surface area support such as gamma alumina which in turn is dispersed upon the carrier) may comprise a refractory ceramic or metal having a honeycomb structure. Suitable refractory ceramic materials include, for example, cordierite (which is preferred), cordierite-alpha alumina, silicon nitride, zircon mullite, spodumene, alumina-silica magnesia, zircon silicate, sillimanite, magnesium silicates, zircon petalite, alpha alumina and aluminosilicates. A metallic honeycomb maybe made of a refractory metal such as stainless steel or other suitable iron-based corrosion-resistant alloys.

The Group IIa metal oxide(s) which are dispersed or deposited on the carrier comprise oxides of magnesium, calcium, barium, strontium and mixtures thereof Preferably, the metal oxide comprises an oxide of magnesium, calcium or strontium. In general, the Group IIa metal oxide is dispersed on the carrier in a loading of about 0.005 to about 1.0 g/in$^3$, preferably 0.1 to 0.6 g/in$^3$, of carrier. Optionally, the undercoat layer includes lanthanum oxide, present in a loading of about 0.005 to about 1.0 g/in$^3$, preferably 0.1 to 0.6 g/in$^3$, of carrier.

The three-way conversion catalyst material employed in the topcoat(s) comprises a platinum-group metal catalytic component such as platinum, palladium, rhodium and mixtures thereof. Preferably, the platinum-group catalytic component comprises a mixture of platinum and rhodium, with the molar ratio of platinum to rhodium being in the range of about 0.2 to about 20 moles, preferably 1 to 5 moles, of platinum per mole of rhodium. Typically, the platinum-group component will be present in the topcoat in a loading of about 5 to about 200 g/ft$^3$ of carrier, preferably 20 to 100 g/ft$^3$ of carrier.

The three-way conversion catalyst material will generally be present in the topcoat(s) in the form of a dispersion on a refractory metal oxide support. Preferably, such support comprises particles having a particle size above about 6–12 micrometers. In general, the support will be present in an amount of about 0.1 to about 4.0 g/in$^3$ of carrier. Suitable refractory metal oxide supports include alumina, silica, titania, silica-alumina, alumina-silicates, aluminum-zirconium oxide, alumina-chromia, alumina-cerium oxide and mixtures thereof. Preferably, the support comprises gamma alumina. Preferably, the gamma alumina is doped with a rare earth component such as lanthanum, neodymium and mixtures thereof. If employed, the rare earth component will be present in an amount of 0.02 to about 0.5/in$^3$ of carrier. It is also preferred that the topcoat include a binder, e.g., zirconia, which may be present in an amount of about 0.02 to about 1.5 g/in$^3$ of carrier.

The hydrogen sulfide-suppressing material may be applied as a dispersion of either the metal or its oxide in powder form in a volatile liquid optionally containing a surfactant to aid in maintaining dispersion, or as a soluble salt or the metal, or as particles of some other compound of the metal which may be easily converted to the oxide form such as by calcination or the like.

In a preferred embodiment, the hydrogen sulfide-suppressing material is impregnated upon particulate stabilized gamma alumina by wetting the gamma alumina with an aqueous solution of a soluble salt of the metal to about incipient wetness, drying and calcining lightly to fix the meal in its oxide form upon the gamma alumina Subsequently, the impregnated gamma alumina is dispersed to form an aqueous slip or gel which is applied as the undercoat layer to the carrier which is to bear the hydrogen sulfide-suppressing material. The three-way conversion catalyst material is subsequently applied as a topcoat layer.

Alternatively, the bare carrier may be dipped in a solution of a soluble salt of the hydrogen sulfide-suppressing material, e.g., an aqueous solution of a nitrate of one or more of the Group IIa metals, e.g., magnesium, calcium, barium and strontium, preferably strontium. The carrier having the solution applied thereto is then calcined to form the oxide(s) of the selected metal(s) thereon. This procedure is repeated as often as necessary to build up a desired thickness of the Group IIa metal oxide on the carrier. Alternatively, the bare carrier may be coated with a slurry of particles of the hydrogen sulfide-suppressing Group IIa metal oxide, such as a slurry of bulk strontium oxide. A binder such as alumina particles may be added to the Group IIa metal oxide slurry to help bind the Group IIa metal oxide particles to the bare carrier. Other refractory material particles may be added to the slurry, such as crushed cordierite, to enhance the porosity of the resultant undercoat.

When the desired amount of hydrogen-sulfide-suppressing material has been deposited on the carrier, a topcoat of the three-way conversion catalyst material is applied thereover using any suitable coating technique, and the finished catalyst composition is calcined. The resultant finished catalyst is placed in the exhaust system of an automobile for use, the exhaust gases flowing through the three-way catalyst topcoat and then through the hydrogen sulfide-suppressing material undercoat.

As mentioned above, the hydrogen sulfide-suppressing material if combined with the three-way conversion catalyst material can interfere with or modify the activity of the platinum-group metals of the three-way conversion catalyst material in undesirable ways. However, by physically segregating the hydrogen sulfide-suppressing material and the three-way conversion catalyst material into discrete layers, the interference is avoided or its deleterious effects are at least minimized.

The total amount of hydrogen-sulfide-suppressing material required will vary depending upon the size and maximum speed (rpm) of the engine in connection with which the catalyst composition of the invention is to be used, as well as the propensity of the particular three-way conversion catalyst material employed to form hydrogen sulfide. The sulfur content of the fuel and hence the amount of sulfur in the exhaust gas is also an important consideration Modern gasoline fuels typically contain about 150 ppm of sulfur.

Amounts of as little as 0.005 gram of hydrogen sulfide-suppressing material per cubic inch of the carrier can be effective in suppressing the formation of hydrogen sulfide. Typically, a total of about 15 grams of hydrogen sulfide-suppressing material may be required for each liter of displacement of an engine which may be operated at speeds of up to 6000 rpm using a gasoline fuel containing 150 ppm of sulfur, the amount required varying approximately in direct proportion to engine size and maximum engine speed.

A typical prior art procedure for preparing the TWC topcoat is as follows: A finely-divided, high surface area, refractory oxide support, e.g., gamma alumina having a surface area of about 100 to 400 $m^2/g$ is combined with deionized water and ball-milled for several minutes. Thereafter, the comminuted slurry is contacted with a solution of a water-soluble, catalytically-promoting metal component, preferably containing one or more platinum group metal components, a solution of platinum as a monoethanolamine complex in deionized water and/or rhodium nitrate in distilled water. A small amount of acetic acid is added and the slurry is again balled milled for about 30 minutes. Preferably, a binder such as zirconia is incorporated in the slurry in the form of a solution of zirconyl acetate in dilute acetic acid is added and the slurry is again ball milled until about 90 wt. % of the particles are reduced to a size of less than 6 microns. The resulting slurry will have a solids content of about 20–40 wt. % and is applied, e.g., by dipping, brushing, etc., to the previously-prepared carrier containing the hydrogen sulfide-suppressing material underlayer. The final catalyst material is then dried, e.g., at 100–150° C. for 1–2 hours and then calcined at, e.g., 350–500° C. for about 0.5–2 hours.

The following nonlimiting examples shall serve to illustrate the present invention. Unless otherwise indicated to the contrary, all parts and percentages are on a weight basis.

EXAMPLE 1

Preparation of Undercoat

The undercoat consisted of 55.5% of gamma alumina, 18.5% of Ce/Zr mixed oxides, 3.7% of lanthanum oxide, 3.7% of zirconia and 18.55% of an oxide which was either barium oxide, ferric oxide, strontium oxide, calcium oxide or manganese oxide. Powdered alumina and Ce/Zr composite material were first well-mixed with de-ionized water. Thereafter, lanthanum in the form of lanthanum nitrate, zirconium in the form of zirconium nitrate and a nitrate of either barium, iron, strontium, calcium or manganese to form a slurry of about 45% solids content and a pH of about 3.5–4.5. The slurry was then milled to reduce 90% of the particles to a particle size of less than 6 micrometers. The final slurry was obtained by adjusting the pH to about 4 and the solids content to a level suitable for coating a ceramic monolithic substrate at a loading of 1.35 g/3 volume of the substrate. The slurry was then applied to a cordierite monolith having 600 cells/$in^3$ followed by drying in an oven at 105° C. for 2 hours and calcination at 550° C. for 1 hour.

EXAMPLE 2

Preparation of Middle Coat—no Group a Metal Oxide Present

The middle layer consisted of 59% gamma alumina, 3.8% zirconia, 1.2% of platinum and 36% Ce/Zr composite oxide. The platinum in the form of a monoethanolamine complex in deionized water was impregnated into the alumina. Deionized water was added along with a zirconium acetate solution equivalent to 3.8% of zirconia in the final solid mixture. The remainder of the components was then added to form a slurry having a solids content of about 45%. The pH of the slurry was adjusted to about 4 and was thereafter milled such that 90% of the particles had a particle size in the range of 6–8 micrometers. The slurry was then applied at a loading of 1.95 g/$in^3$ over the undercoated material resulting from Example 1. Thereafter, drying and calcination were carried out in the same manner as Example 1.

EXAMPLE 3

Preparation of Upper Coat

The upper coat was comprised of 48.5% gamma alumina, 42.8% of a Ce/Zr mixed oxide, 4.3% of zirconia, 1.4% of alumina binder, 2.6% of platinum and 0.3% of rhodium. The platinum in the form of a monoethanolamine complex in de-ionized water and the rhodium in the form of rhodium nitrate in de-ionized water were sequentially impregnated into the alumina. The resultant alumina was then milled with the Ce/Zr composited oxide to a target size of 90% of the particles having a particle size of less than 6 micrometers. The final slurry was then applied over the middle coat of the material resulting from Example 2 and drying and calcination were carried out as described in Example 1.

COMPARATIVE EXAMPLE 4

Preparation of Undercoat

The undercoat consisted of 49.8% gamma alumina, 22.7% of Ce/Zr mixed oxides, 18.5% of calcium oxide, 4.5% of lanthanum oxide, 4.5% of zirconia and 18.5% of an oxide which was either barium oxide, ferric oxide, strontium oxide, calcium oxide or manganese oxide. The procedure for preparation of the undercoat is the same as that set forth in Example 1.

COMPARATIVE EXAMPLE 5

Preparation of Middle Coat—Group IIa Metal Oxide Present

The middle coat was comprised of 52.3% gamma alumina, 11.4% of an oxide which was either barium oxide, ferric oxide, strontium oxide, calcium oxide or manganese oxide. The preparation procedure followed that set forth in Example 2.

COMPARATIVE EXAMPLE 6

Preparation of Upper Coat

The composition of the upper coat and the preparation procedure were identical to that set forth in Example 3.

EXAMPLE 7

Performance Evaluations

Ceramic monolith core samples measuring 1 inch diameter and 3 inches in length were prepared with the catalysts and the procedures set forth in Examples 1–7. Hydrogen sulfide emission tests were carried out in a laboratory reactor. The test protocol involved a sulfur storage step and a sulfur release step. The feed gas for the storage step consisted of 1% $H_2O$, 1.09% $O_2$, 14% $CO_2$, 0.7% CO, 0.07% $C_3H_6$, 0.03% $C_3H_8$, 0.23% $H_2$, 0.15% NO, 25 ppm $SO_2$ and the balance was $N_2$. In the release step, the feed gas consisted of 1% $H_2O$, 0.5% $O_2$, 14% $CO_2$, 3.1% CO, 0.07% $C_3H_6$, 0.03% $C_3H_8$, 1.03% $H_2$, 0.15% NO, 0 ppm $SO_2$ and the balance was $N_2$. All samples were subjected to 10 minutes sulfur storage while the sample was maintained at 550° C. The results set forth in Table I below indicate that lower hydrogen sulfide emissions result from the use of the Group IIa metal oxides solely in the undercoat. The results also indicate that improved results are obtained when the undercoat contains a Group IIa metal oxide rather than a ferric oxide or manganese oxide.

TABLE I

| $H_2S$ emissions (ppm) | BaO in bottom coat | BaO in middle coat | $Fe_2O_3$ in bottom coat |
|---|---|---|---|
| Peak | 191 | 181 | 399 |
| 30 sec. | 86 | 82 | 133 |
| 120 sec. | 50 | 46 | 53 |

| $H_2S$ emissions (ppm) | $Fe_2O_3$ in middle coat | SrO in bottom coat | SrO in middle coat |
|---|---|---|---|
| Peak | 465 | 188 | 192 |
| 30 sec. | 153 | 76 | 85 |
| 120 sec. | 60 | 41 | 47 |

| $H_2S$ emissions (ppm) | CaO in bottom coat | CaO in middle coat | MnO in bottom coat |
|---|---|---|---|
| Peak | 75 | 118 | 192 |
| 30 sec. | 40 | 66 | 104 |
| 120 sec. | 35 | 45 | 60 |

The catalysts were coated on 1 inch diameter×3 inch long ceramic monolith cores. And were subsequently aged in a furnace for 12 hours at 1,000° C. in an atmosphere of 10% $H_2O$ and 90% $N_2$. The results as set forth in Table II below indicate that in all cases, the oxide present in the middle coat allows sulfur interaction with the precious metal component, thereby resulting in an increase of the lightoff temperature.

TABLE II

Lightoff Temperatures 50% Conversion

| Catalyst | Lightoff Temperatures, ° C. | | |
|---|---|---|---|
| | HC | CO | $NO_x$ |
| CaO in bottom coat | 282 | 252 | 279 |
| CaO in middle coat | 292 | 274 | 281 |
| BaO in bottom coat | 268 | 252 | 259 |
| BaO in middle coat | 289 | 269 | 278 |
| SrO in bottom coat | 269 | 252 | 258 |
| SrO in middle coat | 281 | 264 | 271 |

What is claimed is:

1. A hydrogen sulfide suppressing catalyst comprising a Group IIa metal oxide and a lanthanum oxide undercoat disposed on a carrier, and a topcoat discrete layer segregated from, and disposed on, the undercoat comprising a three-way conversion catalyst material overlying the undercoat.

2. The catalyst of claim 1 wherein the metal oxide comprises strontium oxide.

3. The catalyst of claim 1 wherein the carrier comprises a refractive ceramic or metal monolith having a honeycomb structure.

4. The catalyst of claim 3 wherein the ceramic monolith is selected from the group consisting of cordierite, cordierite-alpha alumina, silicon nitride, zircon mullite, spodumene, alumina-silica magnesia, zircon silicate, sillimanite, magnesium silicates, zircon petalite, alpha alumina and aluminosilicates.

5. The catalyst of claim 1 wherein the Group IIa metal oxide is dispersed on the carrier in a loading of about 0.005 to about 1.0 $g/in^3$ of carrier.

6. The catalyst of claim 5 wherein the Group IIa metal oxide is dispersed on the carrier in a loading of 0.1 to 0.6 $g/in^3$ of carrier.

7. The catalyst of claim 1 wherein the lanthanum oxide is present in a loading of about 0.005 to about 1.0 $g/in^3$ of carrier.

8. The catalyst of claim 7 wherein the lanthanum oxide is present in a loading of 0.2 to 0.6 $g/in^3$ of carrier.

9. The catalyst of claim 1 wherein the top coat comprises a middle layer overlying the undercoat and an upper layer overlying the middle layer.

10. The catalyst of claim 1 wherein the three-way conversion catalyst material comprises a platinum-group metal catalytic component.

11. The catalyst of claim 10 wherein the platinum-group metal catalytic component is selected from the group consisting of platinum, palladium, rhodium and mixtures thereof.

12. The catalyst of claim 11 wherein the platinum-group metal catalytic component comprises a mixture of platinum and rhodium.

13. The catalyst of claim 12 wherein the platinum and rhodium are present in the mixture in a molar ratio of about 0.2 to about 20 moles of platinum per mole of rhodium.

14. The catalyst of claim 10 wherein the platinum-group metal catalytic component is present in a loading of about 10 to about 200 $g/ft^3$ of carrier.

15. The catalyst of claim 1 wherein the three-way conversion catalyst material comprises a refractory metal oxide support.

16. The catalyst of claim 15 wherein the support comprises gamma alumina.

17. The catalyst of claim 1 wherein the topcoat further comprises a binder.

* * * * *